United States Patent [19]

Nakamichi

[11] 3,946,923

[45] Mar. 30, 1976

[54] METHOD FOR MANUFACTURING A CAPSTAN DEVICE OF A TAPE MACHINE

[75] Inventor: Niro Nakamichi, Kodaira, Japan

[73] Assignee: Nakamichi Research Inc., Kodaira, Japan

[22] Filed: Oct. 2, 1974

[21] Appl. No.: 511,432

[30] Foreign Application Priority Data

Oct. 4, 1973  Japan............................ 48-111781

[52] U.S. Cl................................. 226/168; 29/467
[51] Int. Cl.²........................................ B65H 17/20
[58] Field of Search .......... 29/169.5, 428, 434, 464, 29/467; 226/168, 190, 194

[56] References Cited
UNITED STATES PATENTS

| | | | |
|---|---|---|---|
| 3,087,665 | 4/1963 | Thomas | 226/190 |
| 3,554,420 | 1/1971 | Agius | 226/190 X |

*Primary Examiner*—Richard A. Schacher
*Attorney, Agent, or Firm*—Woodling, Krost, Granger & Rust

[57] ABSTRACT

A method for manufacturing a capstan device of a tape machine comprising a double walled sleeve including inner and outer sleeve portions, said outer sleeve portion having supporting means provided on the periphery of said outer sleeve portion and mounted on a chassis of said tape machine, upper and lower bearings fitted into said inner sleeve portion at the opposite ends thereof and a capstan including a capstan shaft rotatably extending through said inner sleeve portion and journalled on said bearings, said method comprising the steps of inserting said inner sleeve portion into said outer sleeve portion so as to provide an annular space between said inner and outer sleeve portions, arranging said inner sleeve portion with said outer sleeve portion so that the common axis of said bearings is substantially normal to the top face of said supporting means on said outer sleeve portion and securing said inner sleeve portion to said outer sleeve portion. The present invention also discloses a capstan device manufactured by the aforesaid method in accordance with the present invention.

12 Claims, 6 Drawing Figures

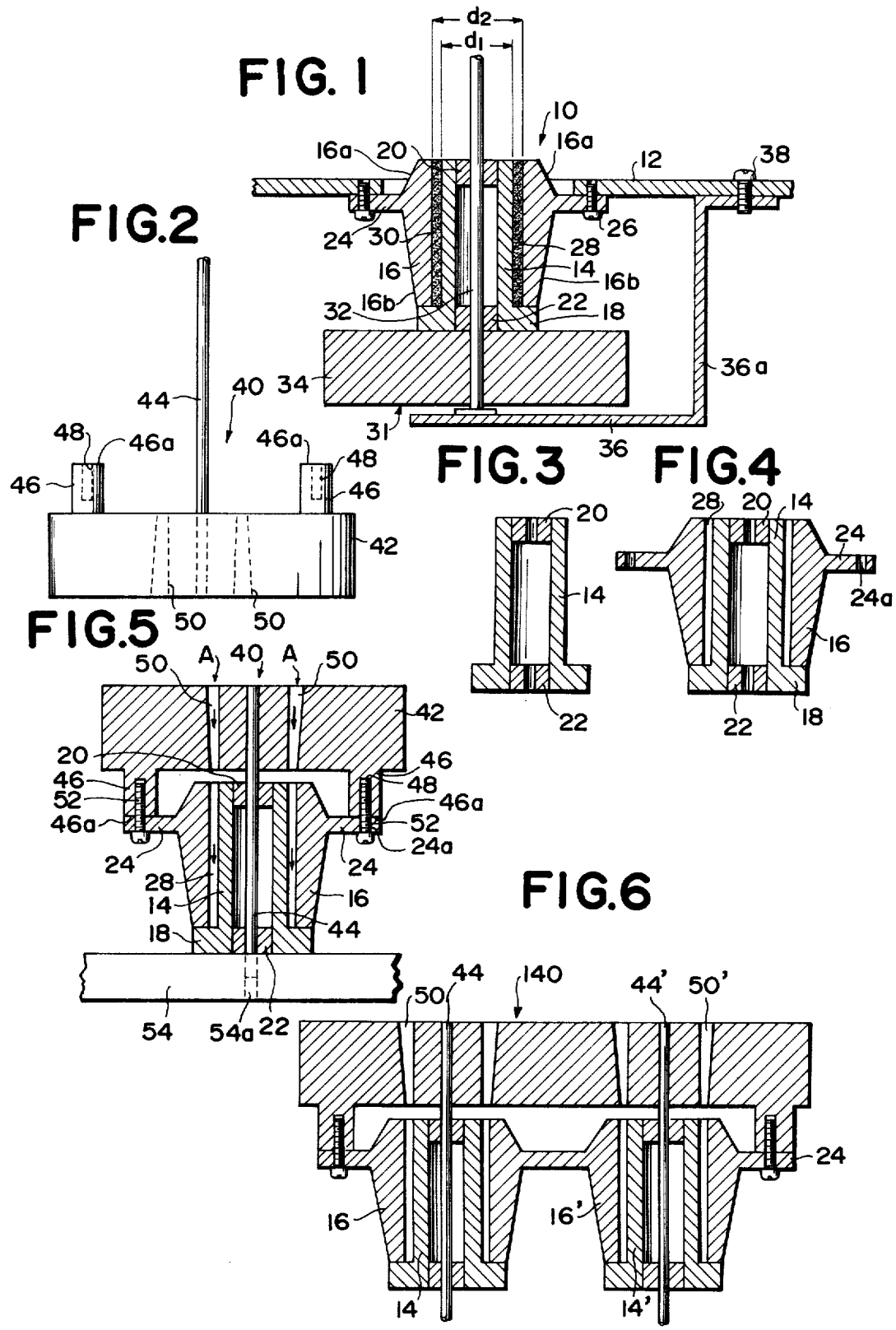

3,946,923

METHOD FOR MANUFACTURING A CAPSTAN DEVICE OF A TAPE MACHINE

BACKGROUND OF THE INVENTION

A capstan device of a tape machine such as a tape recorder is desirably designed so that the capstan has the axis accurately oriented in a traverse manner relative to the running direction of the tape and also in a parallel manner to the width of the tape, because it significantly effects the running of the tape. If otherwise, the engagement of the tape against the head or heads is unstable, which causes unevenness in the sensitivity, cross talks and poor erasing. Thus, the tape machine with such undesirable capstan device has the poor properties. In addition, worst of all, the tape tends to be damaged. In case where the capstan device is of dual type and if it has the respective capstans unproperly arranged, the capstan device more adversely affect the properties of the tape recorder.

One of the conventional capstan devices comprises a sleeve which includes a flange provided on the periphery of the sleeve and adapted to be secured to the chassis of the tape machine so as to have the axis of the sleeve oriented in a vertical manner and upper and lower bearings fitted into the sleeve at the opposite ends thereof and adapted to extend the capstan shaft therethrough so that the axis of the capstan shaft is oriented in a vertical manner. It is well known that in some cases, the sleeve comprises a double walled sleeve.

However, the sleeve and/or the bearings at the engaging surfaces thereof are difficult to be properly finished due to poor working accuracy and particularly the inside surface of the sleeve which is required to have sufficient length is difficult to be accurately finished by drilling all over length in a normal manner to the plane of the flange. Therefore, they tend to have the axes eccentrically oriented to each other. The fact is also caused by fitting the bearings into the sleeve in an unproper manner so that they misalign with the sleeve. Thus, the capstan shaft cannot be accurately oriented in a vertical manner relative to the plane of the chassis. In order to maintain the alignment of the capstan shaft not only during, but also after assembling the capstan device, the sleeve and/or the bearings must be more accurately finished, which causes the tape machine to be expensive.

SUMMARY OF THE INVENTION

Accordingly, it is a principal object of the present invention to provide a method for manufacturing a capstan device wherein it can be easily assembled with an excellent accuracy.

It is another object of the present invention to provide a capstan device of a tape machine wherein a capstan shaft is adapted to be properly and surely oriented in a normal manner to the plane of a chassis of a tape machine.

In accordance with one aspect of the present invention, there is provided a method for manufacturing a capstan device comprising a double walled sleeve including an inner sleeve portion and an outer sleeve portion, said outer sleeve portion having supporting means provided on the periphery of said outer sleeve portion and at the top face mounted on a chassis of said tape machine, upper and lower bearings fitted into said inner sleeve portion at the opposite ends thereof and a capstan including a capstan shaft rotatably extending through said inner sleeve portion and journalled on said bearings, said method comprising the steps of preparing said inner sleeve portion with said upper and lower bearings fitted thereinto; preparing said outer sleeve portion having the inside diameter larger than the outside diameter of said inner sleeve portion and said supporting means provided on the periphery of said outer sleeve portion; inserting said inner sleeve portion into said outer sleeve portion in a generally coaxial relation to each other so as to provide an annular space between said inner and outer sleeve portions; arranging said inner sleeve portion with said outer sleeve portion so that the common axis of said bearings are substantially normal to the top face of said supporting means on said outer sleeve portion by adjusting said inner sleeve portion relative to said outer sleeve portion through said annular space; securing said inner sleeve portion to said outer sleeve portion; and finally extending said capstan shaft through said bearings in a journalled relation thereon.

In accordance with another aspect of the present invention, there is provided a method for manufacturing a capstan device comprising a double walled sleeve including an inner sleeve portion and an outer sleeve portion, said outer sleeve portion having supporting means provided on the periphery of said outer sleeve portion and at the top face mounted on a chassis of said tape machine, upper and lower bearings fitted into said inner sleeve portion at the opposite ends thereof and a capstan including a capstan shaft rotatably extending through said inner sleeve portion and journalled on said upper and lower bearings, said method comprising the steps of preparing said inner sleeve portion with said upper and lower bearings fitted thereinto; preparing said outer sleeve portion having the inside diameter larger than the outside diameter of said inner sleeve portion and said supporting means provided on the periphery of said outer sleeve portion; inserting said inner sleeve portion into said outer sleeve portion in a generally coaxial relation to each other so as to provide an annular space between said inner and outer sleeve portions; preparing a tool having a reference shaft of the same outside diameter as that of said capstan shaft and reference seat face means substantially normal to the axis of said reference shaft; arranging said inner sleeve portion with said outer sleeve portion by mounting said tool on said inner and outer sleeve portions with said reference shaft inserted into said bearings and with said reference seat face means placed on the top face of said supporting means on said outer sleeve portion so that the common axis of said bearings is substantially normal to said top face of said supporting means by adjusting said inner sleeve portion relative to said outer sleeve portion through said annular space; securing said inner sleeve portion to said outer sleeve portion while said tool is mounted on said inner and outer sleeve portions; thereafer removing said tool from said inner and outer sleeve portions; and finally extending said capstan shaft through said bearings in a journalled relation thereon.

BRIEF DESCRIPTION OF THE DRAWINGS

The above and other objects and features of the present invention will be apparent from the teaching of the preferred embodiments of the present invention described with reference to the accompanying drawing in which;

FIG. 1 is an enlarged vertical sectional view of one embodiment of a capstan device in accordance with the present invention;

FIG. 2 is a side elevational view of a tool utilized by the method of the present invention;

FIG. 3 is an enlarged vertical sectional view of the inner sleeve portion;

FIG. 4 is an enlarged vertical view of an assembly of the inner and outer sleeve portions;

FIG. 5 illustrates partially in vertical section the condition of assembling the inner and outer sleeve portions by the present invention; and FIG. 6 is similar to FIG. 5, but illustrating another embodiment of the present invention.

DETAILED DESCRIPTION OF THE PREFERRED EMBODIMENTS OF THE PRESENT INVENTION

Referring now to the accompanying drawing, and more particularly to FIG. 1, there is illustrated a capstan device 10 for a tape machine manufactured by the method of the present invention and the tape machine comprises a chassis 12 on which the components of the tape machine are mounted. The capstan device comprises inner and outer sleeve portions 14 and 16 disposed in a generally coaxial relation to each other. The inner sleeve portion 14 has the outside diameter expressed by a distance $d_1$ and includes an outward flange 18 integral with the lower end of the inner sleeve portion and engaging the outer sleeve portion at the lower end. It will be noted from FIG. 1 that the outward flange 18 has the flat upper surface substantially horizontal or normal to the axis of the inner sleeve portion 14. Upper and lower bearings 20 and 22, which may each comprise an oilless metal sleeve, are fitted into the inner sleeve portion 14 at the upper and lower ends thereof. The outer sleeve portion 16 includes a supporting portion 24 in the form of an outward flange integral with the periphery of the outer sleeve portion 16 adjacent to the upper end thereof. The outer sleeve portion 16 is secured to the chassis 12 by mounting the supporting portion 24 on the chassis by screws 26 extending through and threadedly engaging the supporting portion 24 and the chassis 12. It will be understood that the supporting portion 24 may be alternatively either in the form of equally spaced radial arms with the top faces lying in the common plane or in any other suitable form. The outer sleeve portion 16 is shown to have an upper tapered periphery 16a and a lower tapered periphery 16b which gradually decrease in their outside diameter from adjacent the supporting portion 24 toward the respective ends. It should be noted that the outer sleeve portion 16 has the inside diameter $d_2$ larger than the outside diameter $d_1$ of the inner sleeve portion 14 so as to provide an annular space 28 between the inner and outer sleeve portions 14 and 16. The annular space 28 permits the inner and outer sleeve portions 14 and 16 to be adjusted in alignment with each other as described later in more detail. The annular space 28 is filled with an adhesive 30 which serves to secure the inner sleeve portion 14 to the outer sleeve portion 16. Alternatively, the inner sleeve portion 14 may be secured to the outer sleeve portion 16 by means of soldering, welding or any other physical or mechanical method.

A capstan 31 comprises a capstan shaft 32 which extends through the inner sleeve portion 14 and journalled on the bearings 20 and 22. The capstan shaft is provided with a flywheel 34 secured to the capstan shaft 32 at the lower end thereof. A bearing plate 36 is disposed to bear the capstan shaft 32 so as to prevent it from slipping off the inner sleeve portion 14. The bearing plate has a vertical extension 36a at the upper end secured to the chassis 12 by a screw 38 extending through an threadedly engaging the extension and the chassis.

One of the significant features of the present invention is to provide the annular space 28 between the inner and outer sleeve portions so as to arrange the inner sleeve portion 14 in the outer sleeve portion 16 in a vertical alignment of the axis of the inner sleeve portion even though they are roughly finished. The detail of the feature will be described hereinafter in connection with the assembly of the capstan device 10.

Another feature of the present invention is to use a tool 40 for vertically align the inner sleeve portion on assembly. The tool 40 is shown in FIG. 2 and may comprise a base 42, a reference shaft 44 having the same outside diameter as that of the capstan shaft 32 and secured to the base in a highly accurately normal manner to the horizontal face, and reference seat face means 46 having the seat faces 46a substantially normal to the axis of the reference shaft 44 and lying in the common plane and threaded holes 48 corresponding to the holes 24a of the supporting portion 24 of the outer sleeve portion (FIG. 4). In the illustrated embodiment, reference seat face means 46 may be in the form of two posts having the top faces lying in the common plane and disposed at the edge of the base 42 and symmetrically about the axis of the reference shaft 44. The base 42 may be provided with a plurality of through holes 50 corresponding to the annular space 28 between the inner and outer sleeve portions 14 and 16 for injecting the adhesive into the space. The tool 40 serves to hold the inner and outer sleeve portions 14 and 16 so that the axis of the inner sleeve portion 14 is substantially normal to the upper flat surface of the supporting portions 24 of the outer sleeve portion 16.

Referring now to assembly of the capstan device 10 in connection with FIGS. 3 to 5, initially the inner sleeve portion 14 is prepared with the metal bearings 20 and 22 fitted into the portion 14 in a conventional manner, as shown in FIG. 3. Then, the outer sleeve portion 16 is prepared and the inner sleeve portion 14 together with the bearings 20 and 22 is inserted into the outer sleeve portion 16 as shown in FIG. 4. Thereafter, as seen from FIG. 5, the tool 40 is reversed and mounted on the assembly of the inner and outer sleeve portions 14 and 16 shown in FIG. 4 so that the reference shaft 44 extends through the bearings 20 and 22 and so that the seat faces 46a of reference seat face means 46 are placed on the supporting portion 24 of the outer sleeve portion 16. At that time, the tool 40 is provisionally secured to the outer sleeve portion 16 by screws 52 extending through the holes 24a in the supporting portion 24 and threaded into the threaded holes 48 in the seat face means 46. Thus, it will be noted that the axis of the inner sleeve portion 14 and therefore, those of the bearings 20 and 22 are properly oriented in an accurately normal manner to the top face of the supporting portion 24 of the outer sleeve portion 16. With the inner and outer sleeve portions positioned in such condition, an injector (not shown) at the nozzles in inserted into the through holes 50 in the base 42 of the tool 40 and injects an adhesive into the annular space 28 between the inner and outer sleeve portions 14 and 16 as indicated by arrows A in FIG. 5.

The adhesive may be a synthetic resin such as epoxy resin. After the adhesive is completely solidified, the tool 40 is removed from the assembly of the inner and outer sleeve portions by disengagement of the screws 52 from the flange 24 and the tool 40. As previously described, the inner sleeve portion 14 may be alternatively secured to the outer sleeve portion 16 by means of soldering, welding or any other method. Thereafter, the capstan shaft 32 is inserted into the bearings 20 and 22 of the resultant assembly of the inner and outer sleeve portions 14 and 16 and the assembly is mounted on the chassis 12 by the screws 26 as shown in FIG. 1 while the bearing plate 36 is mounted on the chassis so as to bear the capstan shaft 32 together with the flywheel 34 secured thereto. It will be understood that when the capstan device is assembled an auxiliary bearing base 54 may be preferably disposed so that it may bear the inner sleeve portion 14 to thereby prevent the latter from slipping off the outer sleeve portion before the adhesive is solidified. At that time, the reference shaft 44 at the tip may be inserted into the hole 54a in the base 54. The auxiliary bearing base 54 is useful for the assembly of the inner and outer sleeve portions 14 and 16 in case where the flange 18 of the inner sleeve portion is eliminated. Alternatively, it will be also understood that the flange 18 may be temporally secured to the outer sleeve portion 16 by an instant adhesive.

FIG. 6 shows another embodiment of the present invention wherein a dual capstan device may be assembled in the same manner as described in connection with the aforesaid embodiment. In this embodiment, the tool 140 is substantially identical to that of the aforesaid embodiment, except for two reference shafts 44 and 44' and two sets of through holes 50 and 50' therearound. Two sets of inner and outer sleeve portions 14, 16 and 14', 16' are positioned by the respective reference shafts 44 and 44' so that each of the sets is arranged with the common axis of the bearings accurately normal to the top face of the supporting portion 24 of the outer sleeve portions 16 and 16'. It will be understood that the outer sleeve portions are integral with each other by the common supporting portion 24. Since assembling the dual capstan device is substantially identical to that of the aforesaid embodiment, it will not be described in more detail.

While some preferred embodiments of the present invention have been described in connection with the accompanying drawing, it will be understood by those skilled in the art that various changes and modifications may be made without departing from the spirit and scope of the present invention, which is intended to be defined only to the appended claim.

What is claimed is:

1. A method for manufacturing a capstan device of a tape machine comprising a double walled sleeve including an inner sleeve portion and an outer sleeve portion, said outer sleeve portion having supporting means provided on the periphery of said outer sleeve portion and at the top face mounted on a chassis of said tape machine, upper and lower bearings fitted into said inner sleeve portion at the opposite ends thereof and a capstan including a capstan shaft rotatably extending through said inner sleeve portion and journalled on said bearings, said method comprising the steps of preparing said inner sleeve portion with said upper and lower bearings fitted thereinto; preparing said outer sleeve portion having the inside diameter larger than the outside diameter of said inner sleeve portion and said supporting means provided on the periphery of said outer sleeve portion; inserting said inner sleeve portion into said outer sleeve portion in a generally coaxial relation to each other so as to form an annular space between said inner and outer sleeve portions; arranging said inner sleeve portion with said outer sleeve portion so that the axes of said bearings are substantially normal to the top face of said supporting means on said outer sleeve portion by adjusting said inner sleeve portion relative to the outer sleeve portion through said annular space; securing said inner sleeve portion to said outer sleeve portion; and finally extending said capstan shaft through said bearings in a journalled relation thereon.

2. A method as set forth in claim 1, wherein said step of securing said inner sleeve portion comprises injecting an adhesive into said annular space between said inner and outer sleeve portions and solidifying said adhesive shaft through said bearings in a journalled relation thereon.

3. A method as set forth in claim 1, wherein said inner sleeve portion comprises an outward flange at the lower end of said inner sleeve portion and said outer sleeve portion at the lower end engages said outward flange of said inner sleeve portion.

4. A method as set forth in claim 1, wherein said capstan device is of dual type having two sets of inner and outer sleeve portions and each of the inner sleeve portions is spaced from the corresponding outer sleeve portion so as to provide an annular space between them.

5. A method for manufacturing a capstan device of a tape machine comprising a double walled sleeve including an inner sleeve portion and an outer sleeve portion, said outer sleeve portion having supporting means provided on the periphery of said outer sleeve portion and at the top face mounted on a chassis of said tape machine, upper and lower bearings fitted into said inner sleeve portion at the opposite ends thereof and a capstan including a capstan shaft rotatably extending through inner sleeve portion and journalled on said upper and lower bearings, said method comprising the steps of preparing said inner sleeve portion with said upper and lower bearings fitted thereinto; preparing said outer sleeve portion having the inside diameter larger than the outside diameter of said inner sleeve portion and said supporting means provided on the periphery of said outer sleeve portion; inserting said inner sleeve portion into said outer sleeve portion in a generally coaxial relation to each other so as to provide an annular space between said inner and outer sleeve portions; preparing a tool having a reference shaft of the same outside diameter as that of said capstan shaft and reference seat face means substantially normal to the axis of said reference shaft; arranging said inner sleeve portion with said outer sleeve portion by mounting said tool on said inner and outer sleeve portions with said reference shaft inserted into said bearings and with said reference seat face means placed on the top face of said supporting means on said outer sleeve portion so that the common axis of said bearings is substantially normal to said top face of said supporting means by adjusting said inner sleeve portion relative to said outer sleeve portion through said annular space; securing said inner sleeve portion to said outer sleeve portion while said tool is mounted on said inner and outer sleeve portion; thereafter removing said tool from said inner and outer sleeve portions; and finally extending said capstan shaft through said bearings in a journalled relation thereon.

6. A method as set forth in claim 5, wherein said step of securing said inner sleeve portion comprises injecting an adhesive into said annular space between said inner and outer sleeve portions and solidifying said adhesive.

7. A method as set forth in claim 5, wherein said tool further comprises through holes to inject said adhesive into said annular space therethrough.

8. A method as set forth in claim 5, wherein said inner sleeve portion comprises an outward flange at the lower end of said inner sleeve portion and said outer sleeve portion at the lower end engages said outward flange of said inner sleeve portion.

9. A method as set forth in claim 5, wherein said capstan device is of dual type having two sets of inner and outer sleeve portions and each of the inner sleeve portions is spaced from the corresponding outer sleeve portion so as to provide an annular space between them.

10. A method as set forth in claim 5, further comprising the steps of preparing an auxiliary bearing base and mounting said auxiliary bearing base on said inner and outer sleeve portions so that said base bears said inner sleeve portion so as to prevent said inner sleeve portion from slipping off said outer sleeve portion.

11. A capstan device of a tape machine comprising a double walled sleeve including inner and outer sleeve portions, said outer sleeve portion having supporting means provided on the periphery of said outer sleeve portion and at the top face mounted on a chassis of said tape machine, upper and lower bearings fitted into said inner sleeve portion at the opposite ends thereof and a capstan including a capstan shaft rotatably extending through said inner sleeve portion and journalled on said bearings, characterized by said outer sleeve portion having the inside diameter larger than the outside diameter of said inner sleeve portion, said inner sleeve portion disposed within said outer sleeve portion with an annular space provided between said inner and outer sleeve portions and arranged relative to said outer sleeve portion so that the common axis of said bearings is substantially normal to the top face of said supporting means on said outer sleeve portion, and said inner sleeve portion secured to said outer sleeve portion.

12. A capstan device as set forth in claim 11, wherein said annular space is filled with an adhesive.

* * * * *